Oct. 3, 1933.  E. C. CLARKE  1,929,308
FLASH ROASTING UNIT
Filed July 2, 1932  2 Sheets-Sheet 1

Inventor
Eugene C. Clarke,
by his Attorneys,
Howson & Howson

Oct. 3, 1933.  E. C. CLARKE  1,929,308
FLASH ROASTING UNIT
Filed July 2, 1932  2 Sheets-Sheet 2

Inventor:-
Eugene C. Clarke,
by his Attorneys,
Howson & Howson

Patented Oct. 3, 1933

1,929,308

UNITED STATES PATENT OFFICE 1,929,308

FLASH ROASTING UNIT

Eugene C. Clarke, Chambersburg, Pa., assignor to Bethlehem Foundry & Machine Company, Bethlehem, Pa., a corporation of Pennsylvania Application July 2, 1932. Serial No. 620,675

8 Claims. (Cl. 263—26)

This invention relates to flash roasting apparatus and has for an important object thereof the provision in a flash roasting apparatus of means whereby the gases passing from the actual roasting chamber may be employed to heat the incoming material and assist in drying the same.

A further object of the invention is the provision in an apparatus of this character of an arrangement such that a relatively thin-walled roasting chamber may be employed.

A still further object of the invention is the provision of structure preventing losses as a result of passage of particles from the roasting chamber with the escaping gases.

These and other objects I attain by the construction shown in the accompanying drawings wherein, for the purpose of illustration, I have shown a preferred embodiment of my invention and wherein.

Figure 1:
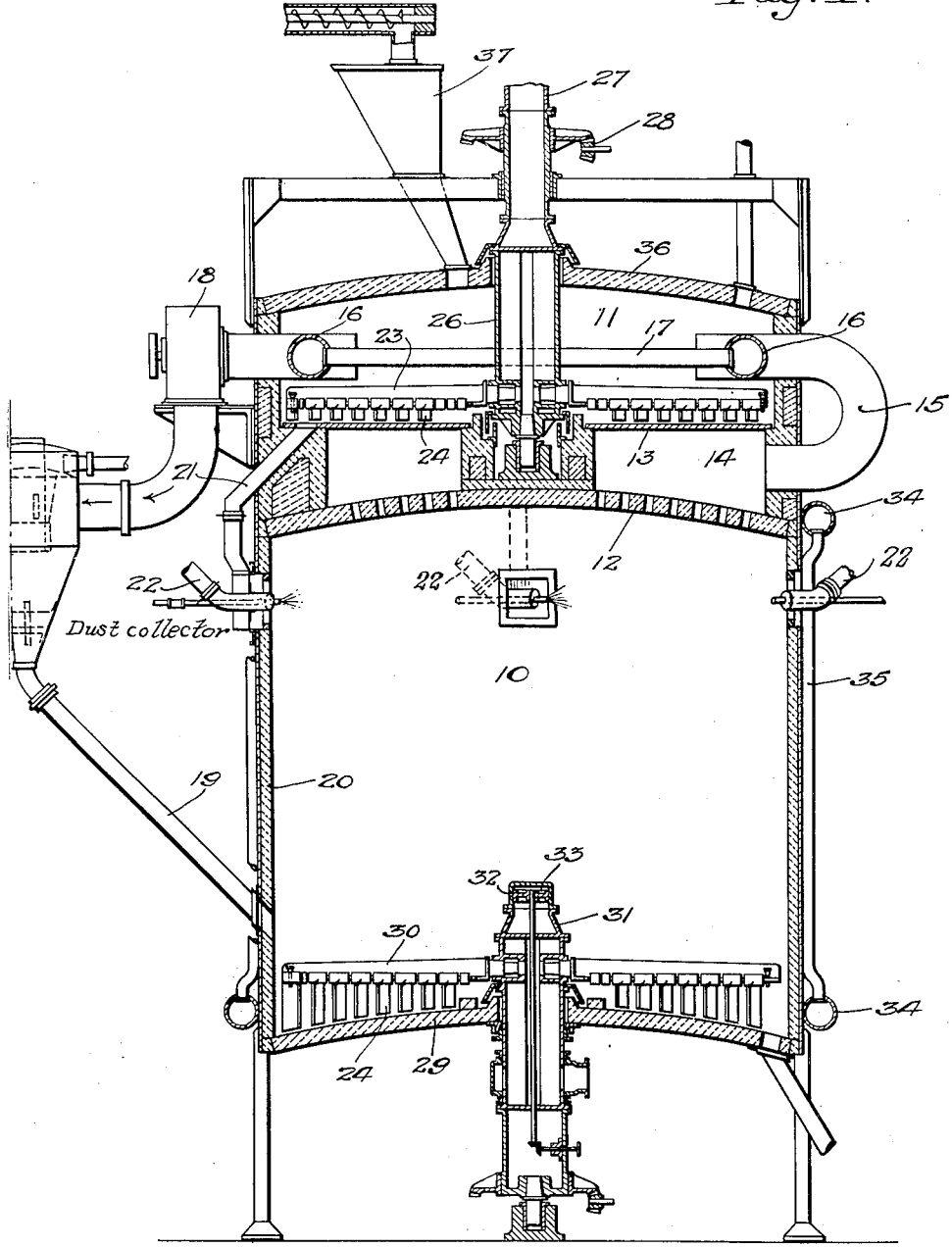
Fig. 1 is a vertical sectional view of a flash roasting apparatus constructed in accordance with my invention.
Figure 2:
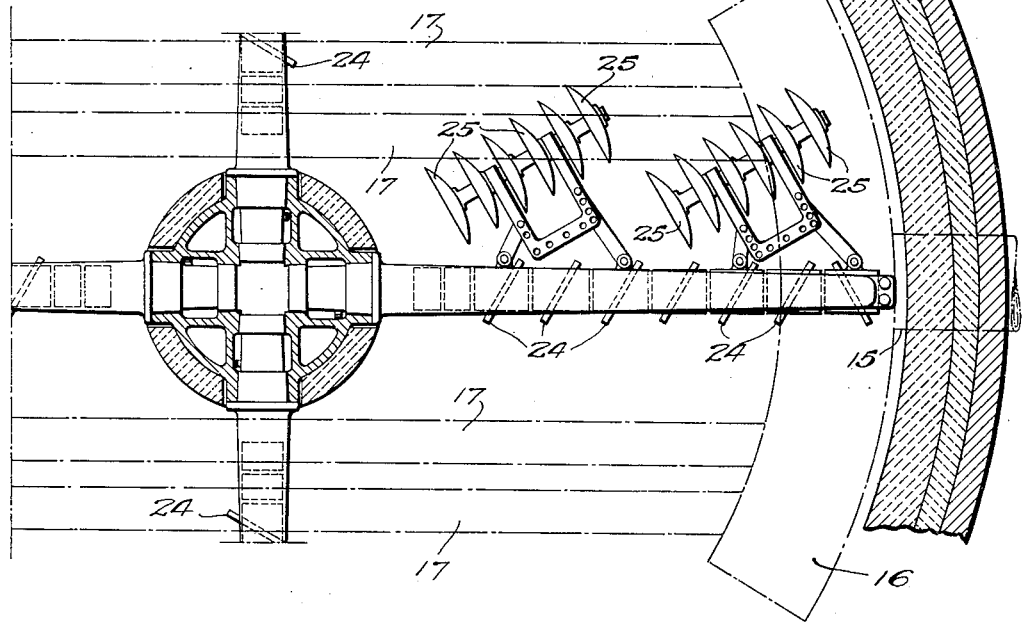
Fig. 2 is an enlarged sectional view through the drying chamber, the heater of the drying chamber being illustrated in dot-and-dash lines.
Figure 3:
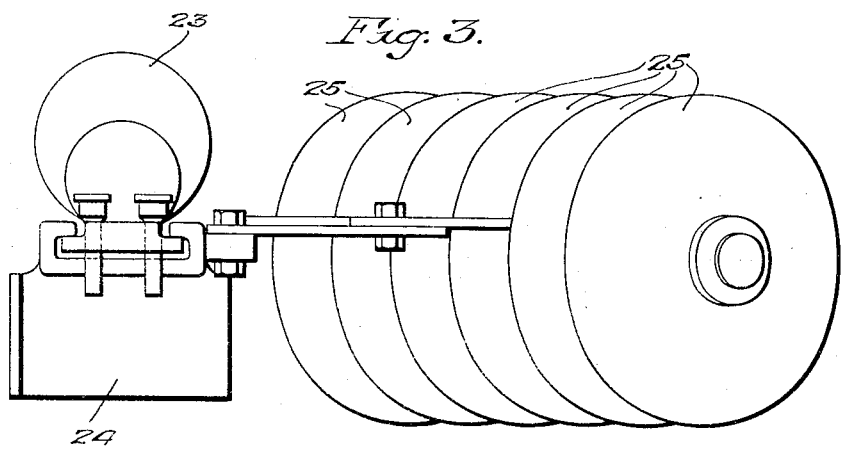
Fig. 3 is an enlarged end elevation of one of the rabble arms of the drying chamber.

Referring now more particularly to the drawings, the numeral 10 generally designates a roasting chamber, and 11 a drying chamber above and in spaced relation to the upper end of the roasting chamber. The roasting chamber has a perforated arch 12 through which gases may pass to engage against the bottom wall 13 of the drying chamber, which is preferably formed of cast iron or some other good conductor of heat. Through the side wall of the intermediate chamber 14 formed between the roasting and drying chambers extends a duct 15, the upper end of which communicates with one of a pair of diametrically opposed headers 16 arranged in the drying chamber and connected with one another by tubes 17. The other of the headers 16 is connected to the intake of the blower 18 discharging to a dust collector as indicated, this dust collector having a discharge outlet 19 communicating with the roasting chamber 10 adjacent the lower end thereof, and through the side wall 20 thereof. The lower wall of the drying chamber has one or more outlets 21 for conducting material to the upper end of the roasting chamber 10 in alignment with the outlet of a pulverized fuel burner, or burners, indicated at 22. As is usual in flash roasting apparatus, these burners will be substantially tangentially directed so that material introduced to the roasting chamber will enter the same with a swirling or rotating motion.

Within the drying chamber, and operating over the bottom wall 13 thereof, are rabble arms 23, these arms including rabble blades 24 to operate in close proximity to the bottom wall 13 and force material thereon to the discharge openings 21. These arms are preferably likewise provided with harrow-like organizations generally designated at 25 in order that the material may be better stirred and drying thus facilitated, it being understood that due to the peculiar arrangement of the drying chamber and to the rapid drying effected therein there is a slight tendency to caking with certain materials.

The rabble arms will be adapted for distribution of air in the treating chamber to assist in the drying operation, being at present shown as mounted on a hollow spindle 26, communicating with an air supply conduit 27 and rotated by suitable mechanism generally indicated at 28. The lower wall 29 of the roasting chamber has arranged thereabove rotating rabble arms 30 similar to the rabble arms 23, but equipped only with rabble blades 24. Air is admitted through these arms to assist in oxidation of the material, and further air may be admitted through the upper end of the spindle 31 upon which the arms are mounted by means of ports 32 which are under control of a valve 33.

In order to facilitate the dissipation of the intense heat generated in the flash roaster, the walls of the roasting chamber are made relatively thin and are surrounded at their upper and lower ends by headers 34 connected by vertically-extending pipes 35 for the circulation of cooling water. The walls of the drying chamber and the intermediate chamber 14 are, of course, made relatively thick so that the heat may be conserved for transfer to the incoming material. Incoming material is introduced through the roof 36 of the drying chamber by suitable mechanism generally designated at 37.

Since the construction employed is, obviously, capable of a certain range of change and modification, without in any manner departing from thes spirit of the invention, I do not wish to be understood as limiting myself thereto except as hereinafter claimed.

I claim:

1. In a flash roaster, a roasting chamber, a drying chamber above and in spaced relation to the roasting chamber, the roasting chamber having a perforated arch, the drying chamber having a bottom wall of heat conducting material and a conduit for conducting gases from the space between the roasting and drying chambers through the drying chamber.

2. In a flash roaster, a roasting chamber, a drying chamber above and in spaced relation to the roasting chamber, the roasting chamber having a perforated arch, the drying chamber having a bottom wall of heat conducting material, a conduit for conducting gases from the space between the roasting and drying chambers through the drying chamber, a tangentially disposed injecting burner in the roasting chamber, and means for conducting materials from the drying chamber to the roasting chamber at the nozzle of the burner.

3. In a flash roaster, a roasting chamber, a drying chamber above and in spaced relation to the roasting chamber, the roasting chamber having a perforated arch, the drying chamber having a bottom wall of heat conducting material, a conduit for conducting gases from the space between the roasting and drying chambers through the drying chamber, and means for separating solid particles from the gases withdrawn from the roasting chamber and returning such solid particles to the roasting chamber at a point adjacent the bottom thereof.

4. In a flash roaster, a flash roasting chamber, a drying chamber, an intermediate chamber having as its upper and lower walls the bottom wall of the drying chamber and the upper wall of the roasting chamber, and means for conducting gases from the upper end of the roasting chamber to said intermediate chamber.

5. In a flash roaster, a flash roasting chamber, a drying chamber, and an intermediate chamber having as its upper and lower walls the bottom wall of the drying chamber and the upper wall of the roasting chamber, the upper wall of the roasting chamber being perforated.

6. In a flash roaster, a flash roasting chamber, a drying chamber, an intermediate chamber having as its upper and lower walls the bottom wall of the drying chamber and the upper wall of the roasting chamber, a heater in the drying chamber and means for conducting gases from the upper end of the flash roasting chamber to the heater through said intermediate chamber.

7. In a flash roaster, a flash roasting chamber, a drying chamber, an intermediate chamber having as its upper and lower walls the bottom wall of the drying chamber and the upper wall of the roasting chamber, the upper wall of the roasting chamber being perforated, a heater in the drying chamber and an outlet for the intermediate chamber communicating with said heater.

8. In a flash roaster, a flash roasting chamber, a drying chamber, an intermediate chamber having as its upper and lower walls the bottom wall of the drying chamber and the upper wall of the roasting chamber, the upper wall of the roasting chamber being perforated, a heater in the drying chamber, an outlet for the intermediate chamber communicating with said heater, a dust collector receiving gases from the heater, and a dust outlet for the dust collector communicating with the roasting chamber adjacent the lower end thereof.

EUGENE C. CLARKE.